(12) United States Patent
Luo et al.

(10) Patent No.: US 8,051,394 B2
(45) Date of Patent: Nov. 1, 2011

(54) YIELD EVALUATING APPARATUS AND METHOD THEREOF

(75) Inventors: Pei-Wen Luo, Kaohsiung County (TW); Jwu-E Chen, Hsinchu (TW); Chin-Long Wey, Kaohsiung (TW); Liang-Chia Cheng, Tainan County (TW); Ji-Jan Chen, Kaohsiung (TW); Wen-Ching Wu, Hsinchu County (TW)

(73) Assignees: Industrial Technology Research Institute, Hsinchu (TW); National Central University, Taoyuan (TW)

( * ) Notice: Subject to any disclaimer, the term of this patent is extended or adjusted under 35 U.S.C. 154(b) by 432 days.

(21) Appl. No.: 12/264,227

(22) Filed: Nov. 3, 2008

(65) Prior Publication Data

US 2010/0088655 A1    Apr. 8, 2010

(30) Foreign Application Priority Data

Oct. 3, 2008    (TW) .............................. 97138267 A

(51) Int. Cl.
G06F 17/50    (2006.01)
G06F 9/455    (2006.01)
G06F 11/22    (2006.01)

(52) U.S. Cl. ........................... 716/56; 716/136; 716/112

(58) Field of Classification Search .................. 716/112, 716/136, 56
See application file for complete search history.

(56) References Cited

U.S. PATENT DOCUMENTS

| 7,679,384 B2 * | 3/2010 | Chen et al. ............... 324/755.11 |
| 2007/0174797 A1 * | 7/2007 | Luo et al. ........................... 716/4 |
| 2008/0148195 A1 * | 6/2008 | Chan et al. ....................... 716/2 |
| 2008/0244475 A1 * | 10/2008 | Lo et al. ............................. 716/4 |
| 2008/0295047 A1 * | 11/2008 | Nehmadi et al. ................. 716/4 |

OTHER PUBLICATIONS

D. Sayed et al. "Automatic Generation of Common-Centroid Capacitor Arrays with Arbitrary Capacitor Ratio", Proceeding of Design, Automation and Test in Europe Conference and Exhibition, Mar. 2002, pp. 576-580.
C. S. G. Conroy et al., "Statistical Design Techniques for D/A Converters", IEEE Journal of Solid-State Circuits, vol. 24, Iss. 4, Aug. 1989, pp. 1118-1128.
J. Xiong et al., "Robust Extraction of Spatial Correlation", IEEE Transactions on Computer-Aided Design of Integrated Circuits and Systems, vol. 26, Iss. 4, Apr. 2007, pp. 619-631.
L. Yao et al., "A 1-V 140 µW 88-dB Audio Sigma-Delta Modulator in 90-nm CMOS", IEEE Journal of Solid-State Circuit, vol. 39, No. 11, Nov. 2004, pp. 1809-1818.

(Continued)

*Primary Examiner* — Stacy Whitmore
*Assistant Examiner* — Magid Dimyan
(74) *Attorney, Agent, or Firm* — Jianq Chyun IP Office

(57) ABSTRACT

A yield evaluating apparatus and a method thereof are provided. The yield evaluating apparatus includes a spatial correlation module. The spatial correlation module receives at least one process-related data and a plurality of circuit layouts and obtains a correlation coefficient between unit elements in the circuit layouts according to the process-related data. The spatial correlation module calculates a spatial correlation between elements in each of the circuit layouts according to the correlation coefficient and selects one of the circuit layouts according to the spatial correlations.

14 Claims, 13 Drawing Sheets

OTHER PUBLICATIONS

Pervez M.Aziz et al., "An overview of sigma-delta converters", IEEE Signal Processing Magazine, issued on Jan. 1996, p. 61-84.

Di Long et al., "Optimal Two-Dimension Common Centroid Layout Generation for MOS Transistors Unit-Circuit", Circuits and Systems, 2005. ISCAS 2005. IEEE International Symposium on, issued on May 23-26, 2005, pp. 2999-3002.

Diaaeldin Khalil et al., "Evaluation of capacitor ratios in automated accurate common-centroid capacitor arrays", Quality of Electronic Design, 2005. ISQED 2005. Sixth International Symposium on, issued on Mar. 21-23, 2005, pp. 1-5.

M.J. Mcnutt et al., "Systematic Capacitance Matching Errors and corrective layout procedures", IEEE Journal of Solid State Circuits, vol. 29, No. 5, issued on May 1994, pp. 611-616.

* cited by examiner

| Spatial correlation / Circuit layout | $\rho_{13}$ | $\rho_{23}$ | $\rho_{24}$ | $\rho_{34}$ |
|---|---|---|---|---|
| FIG. 11A | 0.8295 | 0.8295 | 0.7330 | 0.9280 |
| FIG. 11B | 0.5094 | 0.6007 | 0.4629 | 0.6698 |

FIG. 11C

YIELD EVALUATING APPARATUS AND METHOD THEREOF

CROSS-REFERENCE TO RELATED APPLICATION

This application claims the priority benefit of Taiwan application serial no. 97138267, filed Oct. 3, 2008. The entirety of the above-mentioned patent application is hereby incorporated by reference herein and made a part of this specification.

BACKGROUND OF THE INVENTION

1. Field of the Invention

The present invention relates to a yield evaluating apparatus and a method thereof.

2. Description of Related Art

Along with the advancement of semiconductor techniques, the sizes of electronic devices are getting smaller; however, process variations of these electronic devices and the affections thereof are getting more serious. As a result, product yield may be affected and yield loss may be resulted. Generally speaking, the major factors for causing yield loss are parametric yield and defect-related yield, wherein the parametric yield and the defect-related yield are respectively originated from process variations and defects.

In order to deal with these process variations which are difficult to control, many yield analysis and correction methods, such as the critical area analysis (CAA), the optical proximity correction (OPC), and the chemical mechanical polishing (CMP), etc, are provided by different EDA vendors. However, each of the foregoing analysis and correction methods requires the foundry to provide a process-related data, and corrections can only be carried out at the back-end level after the chip is taped-out. Thus, a chip designer has to revise the circuit layout or even adjust the circuit design in order to allow the product yield to reach a certain target. However, the product may not be brought into the market on time since it is very time-consuming to repeatedly correct the circuit layout or adjust the circuit design.

In order to observe the process variations at the design stage, information of the process variations is usually brought into circuit simulation through Monte-Carlo analysis. Thus, if the process variations can be taken into the consideration on the front-end level of the design flow, the affections thereof to the performance of the circuit can be found out at an early stage and accordingly the product can be brought into the market in a short time. However, it is very time-consuming to simulate the process variations through Monte-Carlo analysis directly in a circuit simulation software (for example, HSPICE), and the method may not be applicable if the circuit is very big.

Generally speaking, the performances of most hybrid or analog circuits are closely related to the element mismatching characteristics of these circuits. For example, the performance of a switched-capacitance circuit, such as an analog-to-digital converter, a digital-to-analog converter, a sampling circuit, or a filter, is directly related to the ratio of the capacitors thereof, wherein the ratio of the capacitors is related to the capacitor mismatching characteristic of the circuit. Thus, element mismatch is usually eliminated through a common centroid method in order to ensure the correctness of the elements.

When the common centroid method is adopted, the element array has to conform to a coincidence rule, a symmetry rule, a dispersion rule, and a compactness rule. The coincidence rule means that each unit element in the element array has to have the same size, the symmetry rule means that the element array has to be symmetric to axis X and axis Y, the dispersion rule means that the dispersion of each unit element in the element array should be uniform, and the compactness rule means that the element array should be very compact. However, the foregoing rules are only used as the layout reference and there is not any discriminant for determining how much an actual layout meets foregoing rules.

Accordingly, some related discriminants are provided for evaluating the common centroid rule. However, these discriminants only analyze the common centroid method according to relative positions between the elements but do not consider the process variations of the elements themselves. Besides, these discriminants are only applicable to rectangular layouts. Thereby, the mismatching results obtained through foregoing methods cannot reflect the actual quality of a circuit and the actual improvement in the product yield.

SUMMARY OF THE INVENTION

Accordingly, the present invention is directed to a yield evaluating apparatus and a method thereof, wherein the affection of element variations to product yield can be analyzed. The yield evaluating apparatus and the method thereof are suitable for different types of circuits, such as a switched-capacitance circuit.

According to the exemplary embodiment consistent with the present invention, a yield evaluating apparatus including a spatial correlation module is provided. The spatial correlation module receives at least one process-related data and a plurality of circuit layouts and obtains a correlation coefficient between unit elements in the circuit layouts according to the process-related data. The spatial correlation module calculates a spatial correlation between elements in each of the circuit layouts according to the correlation coefficient and selects one of the circuit layouts according to the spatial correlations.

According to the exemplary embodiment consistent with the present invention, a yield evaluating method for selecting a circuit layout from a plurality of circuit layouts is further provided. The yield evaluating method includes: obtaining a correlation coefficient between unit elements in the circuit layouts; calculating a spatial correlation between elements in each of the circuit layouts according to the correlation coefficient; and selecting a circuit layout having the greatest spatial correlation from the circuit layouts.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 11A and 11B are respectively diagrams of two different circuit layouts of capacitors C1~C4 in a switched-capacitance filter.

FIG. 11C is a comparison table of spatial correlations between every two of the capacitors C1~C4 of the circuit layouts illustrated in FIGS. 11A and 11B.

DESCRIPTION OF THE EMBODIMENTS

Figure 1A:
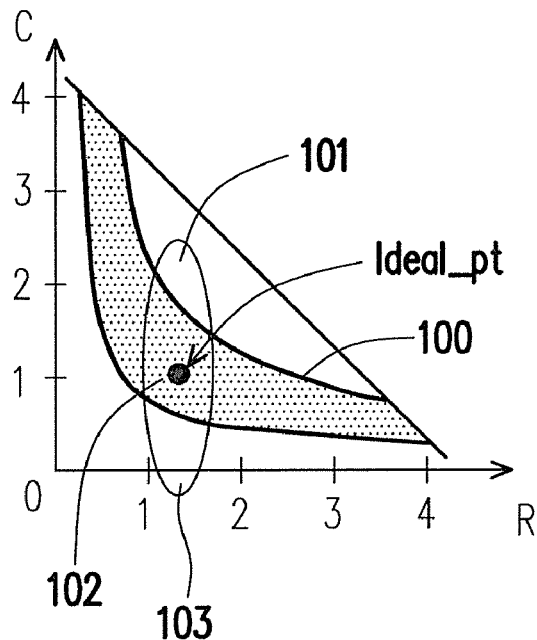
FIG. 1A illustrates the distribution curves of the capacitance and resistance in a RC circuit at a point Ideal_pt.

Reference will now be made in detail to the present preferred embodiments of the invention, examples of which are illustrated in the accompanying drawings. Wherever possible, the same reference numbers are used in the drawings and the description to refer to the same or like parts.

In the real world, the correlation between different elements is closely related to the spatial position of these elements. Generally speaking, the closer two elements in a circuit layout are located, the more similar the variations of these elements are. Thus, while evaluating the yield of a circuit layout, the accuracy of the evaluation can be improved if a spatial correlation between the elements in the circuit layout is taken into consideration.

The exemplary embodiments consistent with the present invention provide a yield evaluating apparatus and a method thereof, wherein the yield of a hybrid or analog circuit is improved by considering the spatial correlation between elements in the circuit. The technique provided by the present invention not only quantifies the rules in the common centroid method but also evaluates the corresponding circuit yield. Besides, the yield evaluating apparatus and the method thereof provided by the exemplary embodiments of the present invention are also applicable to irregular circuit layouts which cannot be processed through the common centroid method. In addition, by using the yield evaluating apparatus and the method thereof provided by the exemplary embodiments of the present invention, the variations and yield loss of a circuit layout on the physical level can be instantly obtained in advance to a circuit designer through calculations performed on the system level so that the time and cost spent on circuit design can be greatly reduced.

Resistors and capacitors will be taken as examples of circuit elements in following descriptions. FIG. 1A illustrates the distribution curves of the capacitance and resistance in a RC circuit at a point Ideal_pt. It can be understood that both the resistance and capacitance of the RC circuit have to be within a tolerable range in order to obtain the optimal performance of the RC circuit. As shown in FIG. 1A, the region 100 (the dotted region) is the tolerable range of the resistance and capacitance. If no process variation is considered, the capacitance and resistance will fall on the point Ideal_pt in FIG. 1A which is completely within the tolerable range of resistance and capacitance.

However, if the factor of process variations is brought into the resistors and capacitors, the capacitance and resistance of these elements will present an elliptic distribution (the ellipse formed by the regions 101, 102, and 103). It can be observed in FIG. 1A that in the elliptic distribution, the regions 101 and 103 are outside of the region 100. Namely, a portion of the capacitance and a portion of the resistance exceed the tolerable range because of the process variations, wherein the regions 101 and 103 are referred to as failed regions.

Figure 1B:
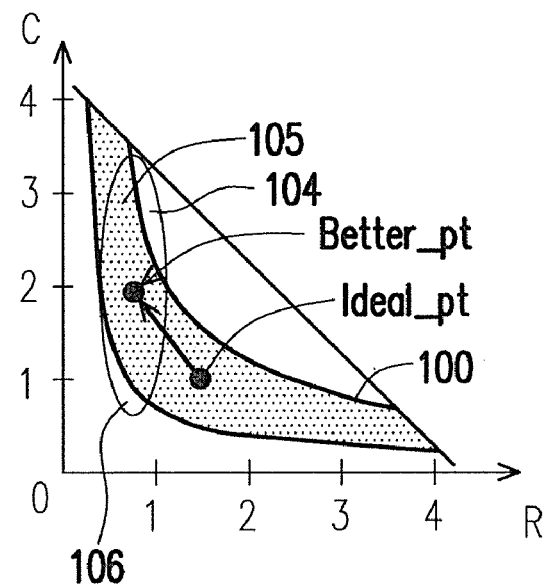
FIG. 1B illustrates the distribution curves of the adjusted capacitance and resistance in a RC circuit.

As shown in FIG. 1A, the yield of the RC circuit is about 50 % due to the affection of the process variations. In order to improve the yield of the RC circuit, the capacitance and resistance of the RC circuit have to be adjusted. FIG. 1B illustrates the distribution curves of the adjusted capacitance and resistance in the RC circuit. Referring to FIG. 1B, the locations of the capacitance and the resistance are moved from the point Ideal_pt to the point Better_pt. Even though the capacitance and the resistance still present an elliptic distribution (the ellipse formed by the regions 104, 105, and 106) due to the affection of the process variations, the areas of the failed regions 104 and 106 are greatly reduced and accordingly the yield of the RC circuit is improved. In other words, the yield of a circuit is greatly reduced if process variations are taken into consideration of the circuit design, and the yield can be increased by adjusting the circuit to find out the optimal parameter point therein.

Figure 1C:
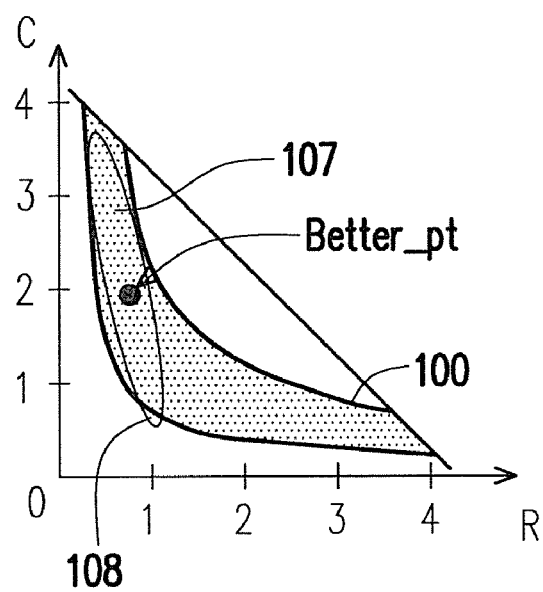
FIG. 1C illustrates the distribution curves of the adjusted capacitance and resistance when a spatial correlation between capacitors and resistors are considered.

However, a bottleneck may be encountered by increasing the yield of a circuit through the method described above. Thus, in the yield evaluating apparatus and the method thereof provided by the exemplary embodiments of the present invention, the spatial correlation between elements is taken into consideration to further increase the circuit yield. FIG. 1C illustrates the distribution curves of the adjusted capacitance and resistance when spatial correlation between the capacitors and resistors are considered. In FIG. 1B, the resistors and capacitors are considered independent to each other (i.e., the spatial correlation between these elements is 0), while in FIG. 1C, spatial correlation between the resistors and the capacitors is considered (i.e., the spatial correlation between these elements is not 0). Without changing the original circuit design, namely, without moving the point Better_pt on which the capacitance and resistance are located, the capacitance and resistance of the RC circuit also present an elliptic distribution (the ellipse formed by the regions 107 and 108); however, the failed region 108 in this elliptic distribution is much smaller than the failed regions 104 and 106 in FIG. 1B. Thereby, the circuit yield is increased when the spatial correlation between the capacitors and the resistors is taken into consideration.

The spatial correlation between elements does exist in the real semiconductor world. Yield evaluation error caused by product overkill or product overpass may be resulted if the spatial correlation between elements is not considered in yield evaluation. As shown in FIG. 1C, by taking the spatial correlation between the elements into consideration, both the accuracy in yield evaluation and the circuit yield are improved Herein, the spatial correlation between any two elements $R_i$ and $R_j$ is defined as $\rho^{D(i,j)}$, $D(i,j)=\sqrt{(i_2-i_1)^2+(j_2-j_1)^2}L$, L represents the unit distance between the elements, the coordinates $(i_1,j_1)$ and $(i_2,j_2)$ respectively represent the positions of the elements $R_i$ and $R_j$ in the circuit layout, and $\rho$ is a correlation coefficient between the elements. The correlation coefficient $\rho$ between the elements has a value between 0 and 1, wherein the correlation coefficient $\rho$ is 1 if i=j. It should be noted herein that the foregoing definition of the spatial correlation is only an exemplary embodiment of the present invention but not for limiting the scope of the present invention, and those having ordinary knowledge in the art should be able to appropriately adjust the definition of the spatial correlation according to the spirit of the present invention.

Figure 2A:
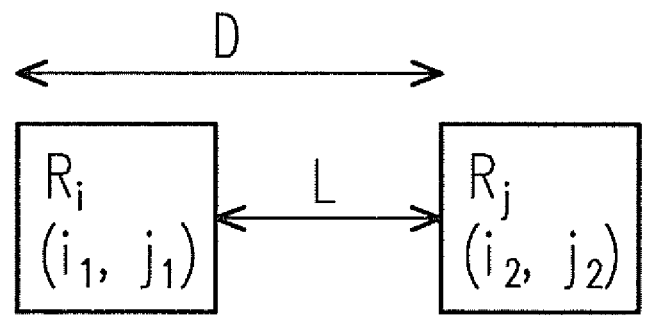
FIG. 2A illustrate a circuit layout of the elements $R_i$ and $R_j$.
Figure 2B:
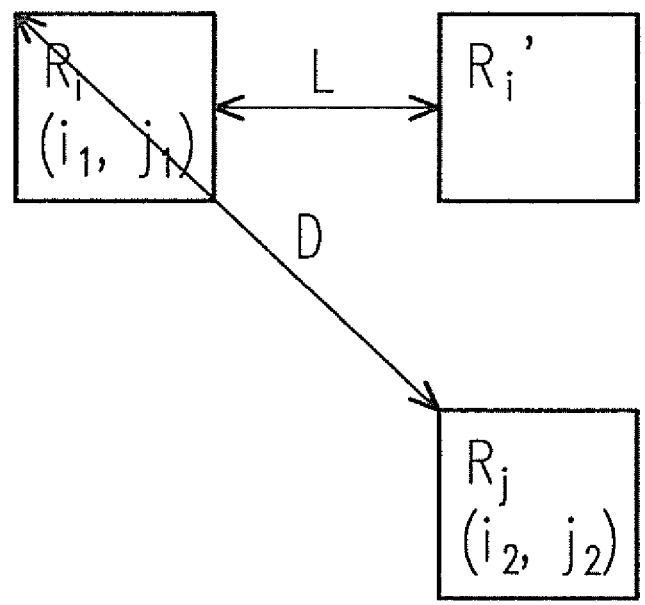
FIG. 2B illustrates another circuit layout of the elements $R_i$ and $R_j$.

FIG. 2A illustrate a circuit layout of the elements $R_i$ and $R_j$, and FIG. 2B illustrates another circuit layout of the elements $R_i$ and $R_j$. Referring to FIG. 2A and FIG. 2B, the distance D between the elements $R_i$ and $R_j$ in FIG. 2A is different from the distance D between the elements $R_i$ and $R_j$ in FIG. 2B, and the distance D between the elements $R_i$ and $R_j$ in FIG. 2B is greater than that in FIG. 2A. Accordingly, the spatial correlation between the elements $R_i$ and $R_j$ in FIG. 2B is smaller than that in FIG. 2A.

Herein it is assumed that the capacitor $C_s$ is composed of N unit capacitors $\{C_{s1}, C_{s2}, \ldots, C_{sN}\}$ (i.e., $C_s=C_{s1}+C_{s2}+\ldots C_{sN}$) and $\rho_{s(m,n)}$ is the spatial correlation between two unit capacitors $C_{sm}$ and $C_{sn}$, wherein m and n are integers greater than 0 and smaller than N+1. Accordingly, the spatial correlations between the unit capacitors in the capacitor $C_s$ can be represented by a N×N spatial correlation array $\Omega$, wherein $\Omega=(\rho_{s(m,n)})_{N \times N}$. If the total spatial correlation between the unit capacitors in the capacitor $C_s$ is defined to be $S_{cs}$ (i.e., $S_{cs}=\Sigma_{m=1}^{N-1}\Sigma_{n=m+1}^{N}\rho_{s(m,n)}$), the circuit yield and which circuit layout should be selected can be determined according to the total spatial correlation $S_{cs}$. The foregoing definition of the total spatial correlation $S_{cs}$ is only an exemplary embodiment of the present invention but not for limiting the scope of the present invention, and those having ordinary knowledge in the art may also define the total spatial correlation $S_{cs}$ as the total of elements in the spatial correlation array $\Omega$.

Figure 3A:
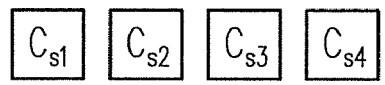
FIGS. 3A~3D are respectively diagrams of the different circuit layouts of the capacitor $C_s$, wherein the capacitor $C_s$ is composed of four unit capacitors $\{C_{s1}, C_{s2}, C_{s3}, C_{s4}\}$.
Figure 3B:
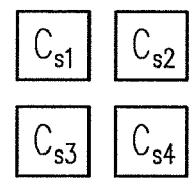

FIGS. 3A~3D are respectively diagrams of different circuit layouts of the capacitor $C_s$, wherein the capacitor $C_s$ is composed of four unit capacitors $\{C_{s1}, C_{s2}, C_{s3}, C_{s4}\}$. Herein it is assumed that the unit distance between the unit capacitors is 1, the correlation coefficient between the unit capacitors is $\rho_u$, the correlation coefficient $\rho_u$ has a value 0.5, and the distance between the coordinates of two closest unit capacitors is 1. In FIG. 3A, based on the foregoing definition of the spatial correlation, $\rho_{s(1,2)}=\rho_{s(2,3)}=\rho_{s(3,4)}=\rho_u$, $\rho_{s(1,3)}=\rho_{s(2,4)}=\rho_u^2$, $\rho_{s(1,4)}=\rho_u^3$, and accordingly the total spatial correlation $S_{cs}$ is 2.125. In FIG. 3B, based on the foregoing definition of the spatial correlation, $\rho_{s(1,2)}=\rho_{s(1,3)}=\rho_{s(2,4)}=\rho_{s(3,4)}=\rho_u$, $\rho_{s(1,4)}=\rho_{s(2,3)}=\rho_u^{\sqrt{2}}$, and accordingly the total spatial correlation $S_{cs}$ is 2.75.

Figure 3C:
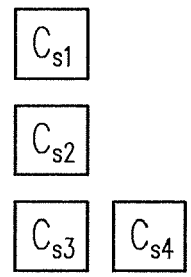
Figure 3D:
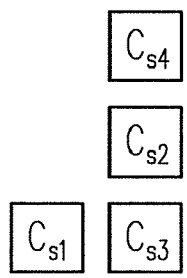

In FIG. 3C, based on foregoing definition of the spatial correlation, $\rho_{s(1,2)}=\rho_{s(2,3)}=\rho_{s(3,4)}=\rho_u$, $\rho_{s(1,3)}=\rho_u^2$, $\rho_{s(1,4)}=\rho_u^{\sqrt{5}}$, $\rho_{s(2,4)}=\rho_u^{\sqrt{2}}$, and accordingly the total spatial correlation $S_{cs}$ is 2.34. In FIG. 3D, based on the foregoing definition of the spatial correlation, $\rho_{s(1,3)}=\rho_{s(2,3)}=\rho_{s(2,4)}=\rho_u$, $\rho_{s(3,4)}=\rho_u^2$, $\rho_{s(1,4)}=\rho_u^{\sqrt{5}}$, $\rho_{s(1,2)}=\rho_u^{\sqrt{2}}$, and accordingly the total spatial correlation $S_{cs}$ is 2.34. When the capacitor is composed of the same number of unit capacitors, the different circuit layouts will result in the different spatial correlations. However, in the circuit layouts illustrated in FIG. 3C and FIG. 3D, the same total spatial correlations are produced because the unit capacitors have the same relative position. As described above, in FIGS. 3A~3D, the circuit layout in FIG. 3B has the greatest total spatial correlation so that the greatest yield of the capacitor $C_s$ can be achieved if the circuit layout in FIG. 3B is adopted.

Next, the circuit layout of a plurality of elements will be described. Herein it is assumed that the elements are two capacitors $C_s$ and $C_t$, the capacitor $C_s$ is composed of p unit capacitors $\{C_{s1}, C_{s2}, \ldots, C_{sp}\}$ (i.e., $C_s=C_{s1}+C_{s2}+\ldots+C_{sp}$), and the capacitor $C_t$ is composed of q unit capacitors $\{C_{t1}, C_{t2}, \ldots, C_{tq}\}$ (i.e., $C_t=C_{t1}+C_{t2}+\ldots+C_{tq}$). First, the spatial correlation between the two unit capacitors $C_{sm}$ and $C_{sn}$ is defined to be $\rho_{s(m,n)}$, the spatial correlation between the two unit capacitors $C_{tm}$ and $C_{tn}$ is defined to be $\rho_{t(m,n)}$, and the spatial correlation between the two unit capacitors $C_{sm}$ and $C_{tn}$ is defined to be $\rho_{st(m,n)}$.

Then, the total spatial correlation between the unit capacitors in the capacitor $C_s$ is defined to be $S_{cs}$ (i.e., $S_{cs}=\Sigma_{m=1}^{p-1}\Sigma_{n=m+1}^{p}\rho_{s(m,n)}$), the total spatial correlation between the unit capacitors in the capacitor $C_t$ is defined to be $S_{ct}$ (i.e., $S_{ct}=\Sigma_{m=1}^{q-1}\Sigma_{n=m+1}^{q}\rho_{t(m,n)}$), and the total spatial correlation between the unit capacitors $C_{sm}$ and $C_{tn}$ is defined to be $S_{st}$ (i.e., $S_{st}=\Sigma_{m=1}^{p}\Sigma_{n=1}^{q}\rho_{st(m,n)}$). The spatial correlation between the capacitors $C_s$ and $C_t$ can be obtained as $\rho_{cst}$ according to the statistical characteristics between the elements. The greater the spatial correlation $\rho_{cst}$ between the capacitors $C_s$ and $C_t$ is, the smaller the variation $Var(C_s/C_t)$ of the ratio between the capacitors $C_s$ and $C_t$ is, and theoretically the higher the circuit yield will be. The spatial correlation $\rho_{cst}$ between the capacitors $C_s$ and $C_t$ can be expressed as:

$$\rho_{cst} = \frac{S_{st}}{\sqrt{[p+2S_{cs}] \times [q+2S_{ct}]}}.$$

It can be understood from the foregoing expression that if the spatial correlation $\rho_{cst}$ between the capacitors $C_s$ and $C_t$ can be calculated according to the parameters p, q, $S_{cs}$, $S_{ct}$, and $S_{st}$ in different circuit layouts, a circuit layout having the greatest yield can be selected from these circuit layouts, and this circuit layout having the greatest yield has the greatest spatial correlation $\rho_{cst}$ among all the circuit layouts.

Figure 4A:
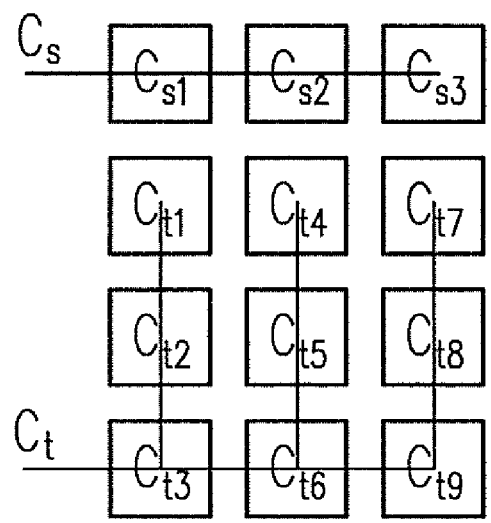
FIGS. 4A and 4B are respectively diagrams of two different circuit layouts of capacitors $C_s$ and $C_f$.
Figure 4B:
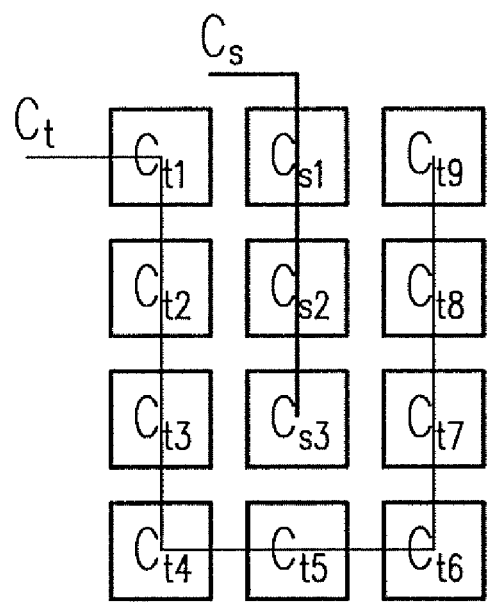

The foregoing concept will be described below with an example. FIGS. 4A and 4B are respectively diagrams of two different circuit layouts of the capacitors $C_s$ and $C_t$. Referring to FIGS. 4A and 4B, the capacitor $C_s$ is composed of 3 unit capacitors (i.e., p=3), wherein these unit capacitors are respectively $C_{s1}$, $C_{s2}$, and $C_{s3}$. The capacitor $C_t$ is composed of 9 unit capacitors (i.e., q=9), wherein these unit capacitors are respectively $C_{t1}$, $C_{t2}$, ..., $C_{t9}$. It is assumed that the unit distance between the unit capacitors is 1, the correlation coefficient between the unit capacitors is $\rho_u$, the correlation coefficient $\rho_u$ has a value 0.5, and the distance between the coordinates of the closest two unit capacitors is 1.

Based on the foregoing definitions, the total spatial correlation $S_{cs}$ in FIG. 4A between the unit capacitors in the capacitor $C_s$ is obtained to be 1.25, the total spatial correlation $S_{ct}$ between the unit capacitors in the capacitor $C_t$ is 12.48, and the total spatial correlation $S^{st}$ between the unit capacitors $C_{sm}$ and $C_{tm}$ is 6.29. The spatial correlation $\rho_{cst}$ between the capacitors $C_s$ and $C_t$ is calculated to be 0.4 based on the parameters p, q, $S_{cs}$, $S_{ct}$, and $S_{st}$. Regarding the circuit layout in FIG. 4A, it can be observed that the variation $Var(C_s/C_t)$ of the ratio between the capacitors $C_s$ and $C_t$ is 0.0825 if the value of each unit capacitor is set with 2000 random sampling points.

Similarly, referring to FIG. 4B, the total spatial correlation $S_{cs}$ between the unit capacitors in the capacitor $C_s$ is calculated to be 1.25, the total spatial correlation $S_{ct}$ between the unit capacitors in the capacitor $C_t$ is 9.65, the total spatial correlation $S_{st}$ between the unit capacitors $C_{sm}$ and $C_{tn}$ is 9.12, and the spatial correlation $\rho_{cst}$ between the capacitors $C_s$ and $C_t$ is obtained to be 0.73 according to the parameters p, q, $S_{cs}$, $S_{ct}$, and $S_{st}$. Regarding the circuit layout in FIG. 4A, it can be observed that the variation $Var(C_s/C_t)$ of the ratio between the capacitors $C_s$ and $C_t$ is 0.0566 if the value of each unit capacitor is set with 2000 random sampling points.

It can be understood from the two examples illustrated in FIG. 4A and FIG. 4B that the greater the spatial correlation $\rho_{cst}$ between the capacitors $C_s$ and $C_t$ is, the lower the variation $Var(C_s/C_t)$ of the ratio between the capacitors $C_s$ and $C_t$ is, and accordingly the higher the circuit yield will be. In other words, different circuit layout results in different total spatial correlations $S_{cs}$, $S_{ct}$, and $S_{st}$, and these total spatial correlations directly affect the variation of the ratio between the capacitors. Accordingly, the spatial correlation $\rho_{cst}$ between the capacitors $C_s$ and $C_t$ is determined by the distribution of the capacitors $C_s$ and $C_t$ in the entire capacitor array. Thus, the more evenly distributed the capacitors $C_s$ and $C_t$ are, the greater the spatial correlation $\rho_{cs}$ between the capacitors $C_s$ and $C_t$ is. This conclusion also applies to the dispersion rule in the common centroid method.

FIGS. 5A~5G are respectively diagrams of the different circuit layouts of the capacitors $C_s$ and $C_t$. Referring to FIGS. 5A~5G, the capacitor $C_s$ is composed of four (i.e., p=4) unit capacitors (marked with black background), and the capacitor $C_t$ is composed of 26 (i.e., q=26) unit capacitors (marked with white background). It is assumed that the unit distance between the unit capacitors is 1, the correlation coefficient between the unit capacitors is $\rho_u$, the correlation coefficient $\rho_u$ has a value 0.5, and the distance between the coordinates of the closest two unit capacitors is 1.

As described above, in FIGS. 5A~5G, the spatial correlation $\rho_{cst}$ of the capacitors $C_s$ and $C_t$ can be respectively calculated, and the spatial correlations $\rho_{cst}$ in FIGS. 5A~5G are respectively 0.533, 0.792, 0.770, 0.712, 0.783, 0.728, and 0.769. A user can find out a circuit layout having the greatest yield according to the spatial correlation $\rho_{cst}$ of the capacitors $C_s$ and $C_t$. Among foregoing examples, the circuit layout illustrated in FIG. 5B has the greatest yield.

Figure 5A:
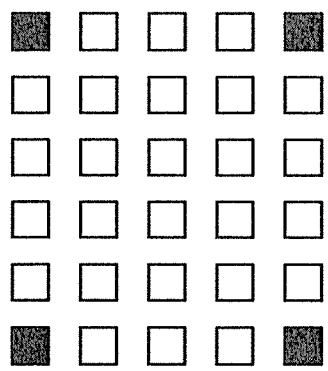
FIGS. 5A~5G are respectively diagrams of the different circuit layouts of the capacitors $C_s$ and $C_f$.
Figure 5B:
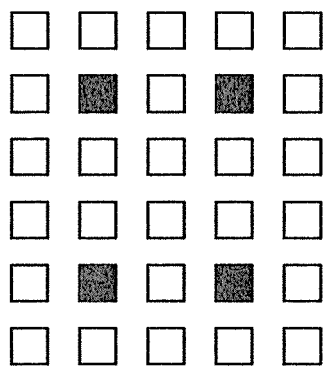
Figure 5C:
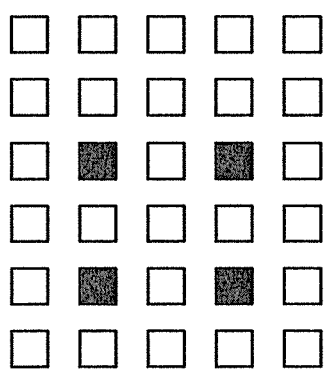
Figure 5D:
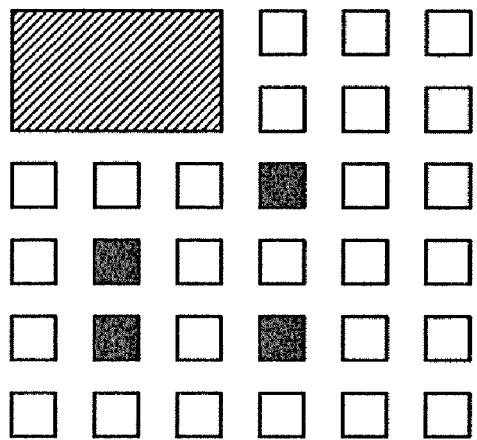

It should be mentioned herein that the circuit layouts in FIGS. 5A~5C are all based on the common centroid method, and all these circuit layouts have the same coincidence, symmetry, and compactness. However, the circuit layout in FIG. 5B has higher dispersion. Accordingly, the circuit layout in FIG. 5B has greater yield. As described above, by finding the circuit layout having the greatest yield according to the spatial correlation $\rho_{cst}$ between the capacitors $C_s$ and $C_t$, the circuit layout in FIG. 5B has the greatest yield since it has the greatest spatial correlation $\rho_{cst}$. The conclusion obtained through the foregoing method tallies with the conclusion obtained through the conventional common centroid method. Thus, a chip designer can select the optimal circuit layout (having the greatest yield) based on the spatial correlation between elements.

Figure 5E:
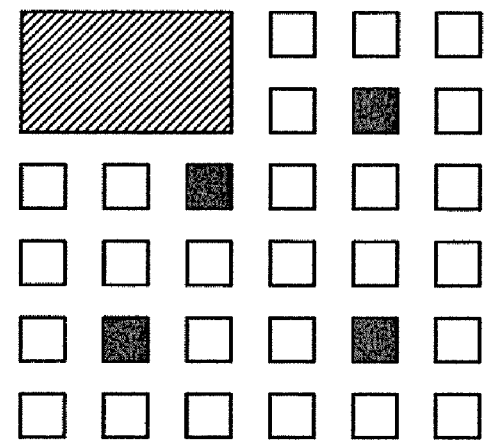
Figure 5F:
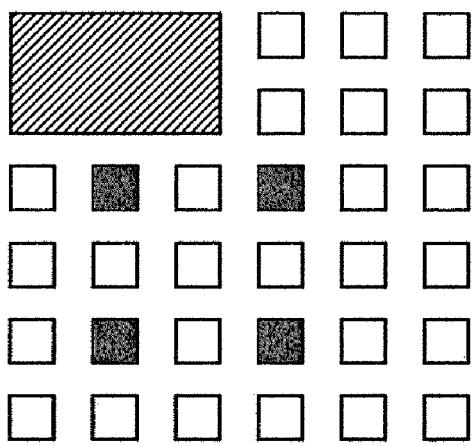
Figure 5G:
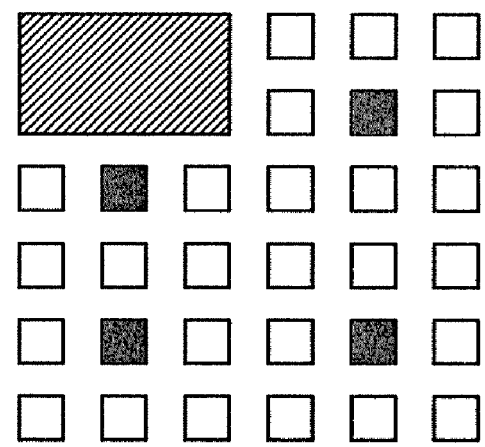

However, the conventional common centroid method is only applicable to rectangular circuit layouts, and the yield of a circuit layout having an irregular surface (as shown in FIGS. 5D~5G) cannot be evaluated through the common centroid method. However, the yield evaluating apparatus and the method thereof provided by the exemplary embodiments of the present invention can be applied to the irregular circuit layouts. Among the examples illustrated in FIGS. 5D~5G, the yield of the circuit layout in FIG. 5E is greater than those of the circuit layouts in FIGS. 5D, 5F, and 5G because the circuit layout in FIG. 5E has the greatest spatial correlation $\rho_{cst}$.

Figure 6:
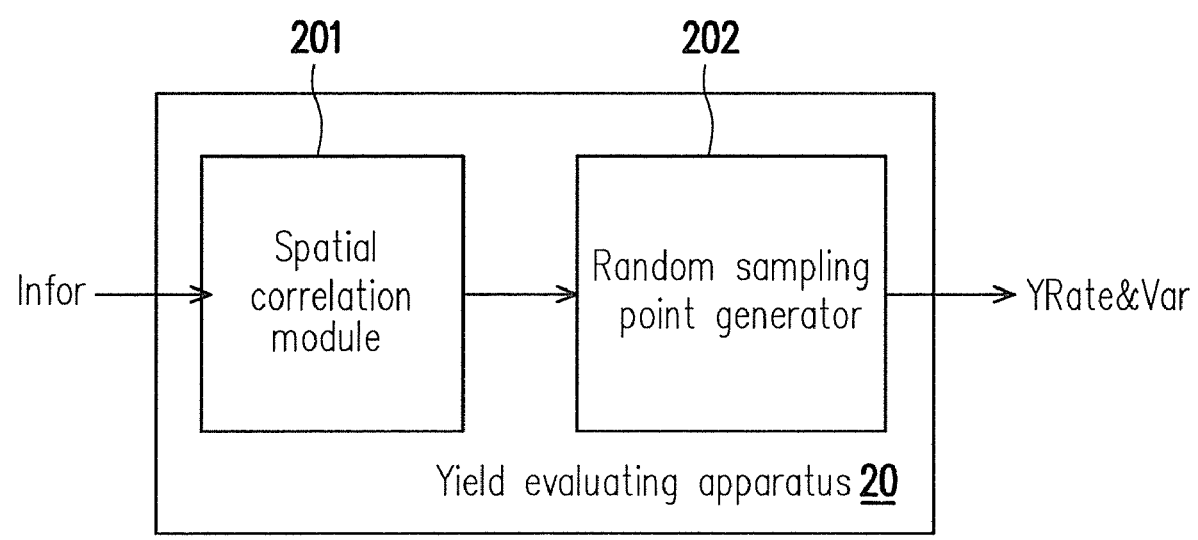
FIG. 6 is a system block diagram of a yield evaluating apparatus 20 according to an exemplary embodiment of the present invention.

FIG. 6 is a system block diagram of a yield evaluating apparatus 20 according to an exemplary embodiment of the present invention. Referring to FIG. 6, the yield evaluating apparatus 20 includes a spatial correlation module 201 and a random sampling point generator 202, wherein the spatial correlation module 201 and the random sampling point generator 202 are coupled to each other. The spatial correlation module 201 receives the information Infor, wherein the information Infor contains a process-related data provided by a foundry and a plurality of circuit layouts provided by a chip designer or the foundry. The process-related data provided by the foundry contains a variation of unit elements or a correlation coefficient between the unit elements.

If the process-related data provided by the foundry does not contain the correlation coefficient between the unit elements, the spatial correlation module 201 extracts the correlation coefficient between the unit elements according to a variation trend diagram of the unit elements. Besides, the spatial correlation module 201 calculates the spatial correlation between the elements in each of the circuit layouts.

While calculating the spatial correlation between the elements in each of the circuit layouts, because each element is composed of a plurality of unit elements, the spatial correlation module 201 first calculates a total spatial correlation between the unit elements in each of the elements and a total spatial correlation between the unit elements in different elements. The method for calculating the total spatial correlation between the unit elements in each of the elements and the total spatial correlation between the unit elements in different elements has been described above, and therefore it will not be described herein.

Thereafter, the spatial correlation module 201 calculates a spatial correlation between the elements according to the total spatial correlation between the unit elements in each of the elements, the total spatial correlation between the unit elements in different elements, and the number of unit elements in each of the elements. The method for calculating the spatial correlation between the elements has been described above, and therefore it will not be described again. The spatial correlation module 201 selects a circuit layout having the greatest spatial correlation from these circuit layouts and requests the random sampling point generator 202 to perform a random sampling to the circuit layout having the greatest spatial correlation.

The random sampling point generator 202 performs a random sampling to each unit element in the circuit layout having the greatest spatial correlation to generate a plurality of testing circuit samples. The random sampling point generator 202 tests the testing circuit samples to evaluate a yield YRate of the circuit layout. In addition, the random sampling point generator 202 may even analyze the testing circuit samples to obtain a variation Var of a ratio between the elements.

Figure 7:
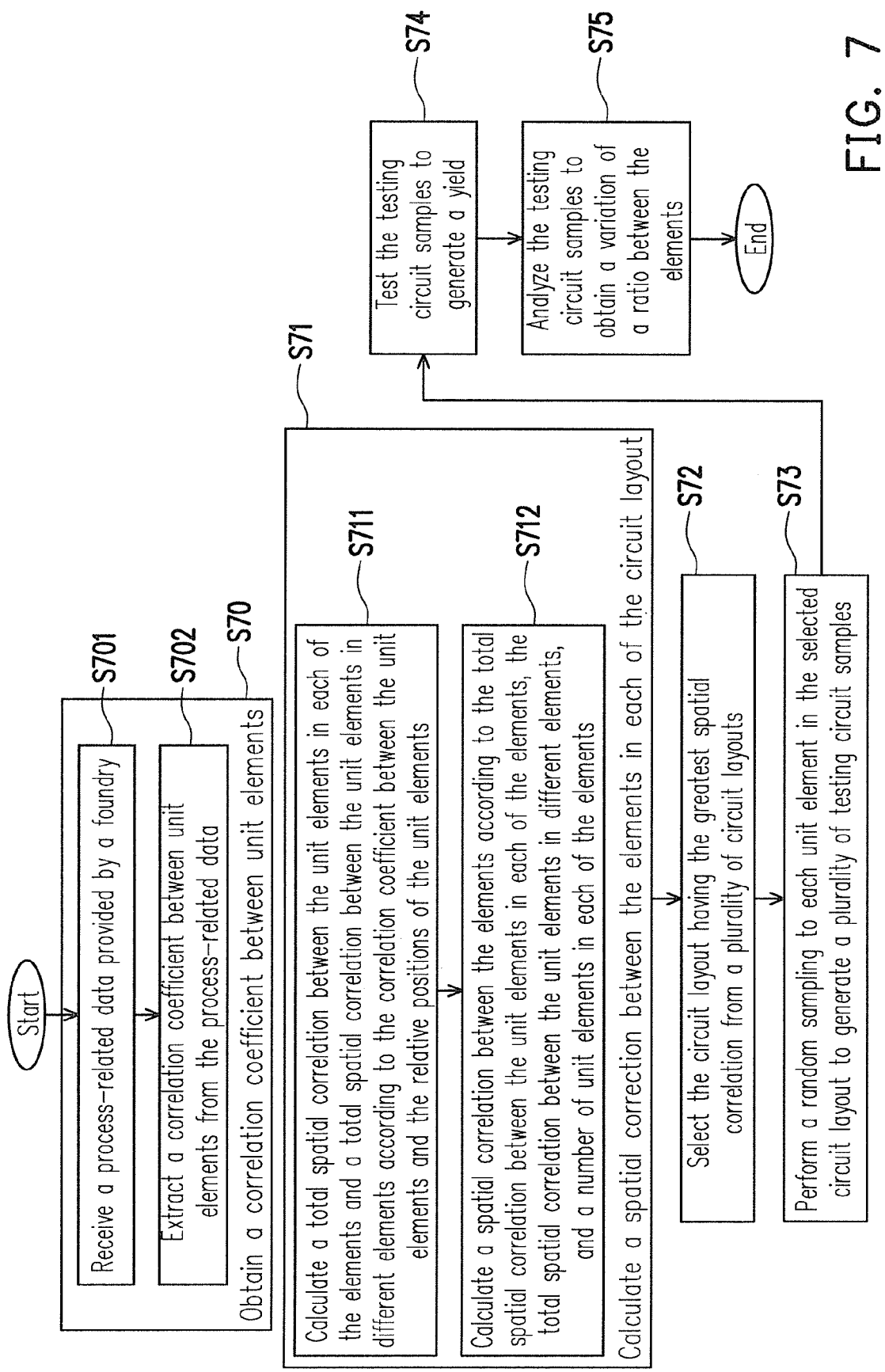
FIG. 7 is a flowchart of a yield evaluating method according to an exemplary embodiment of the present invention.

FIG. 7 is a flowchart of a yield evaluating method according to an exemplary embodiment of the present invention. Referring to FIG. 7, first, in step S70, a correlation coefficient between the unit elements is obtained. The step S70 can be accomplished through two sub-steps S701 and S702; however, the present invention is not limited to such an implementation. In sub-step S701, a process-related data provided by a foundry is received, wherein the process-related data may contain a variation of the unit elements or the correlation coefficient between the unit elements. In sub-step S702, the correlation coefficient between the unit elements is extracted from the process-related data. In addition, as described above, if the process-related data provided by the foundry does not contain the correlation coefficient between the unit elements, the correlation coefficient between the unit elements can be extracted according to a variation trend diagram of the unit elements.

In step S71, a spatial correlation between elements in each of the circuit layouts is calculated. Step S71 can be accomplished through two sub-steps S711 and S712; however, the present invention is not limited to such an implementation. In sub-step S711, a total spatial correlation between the unit elements in each of the elements and a total spatial correlation between the unit elements in different elements are calculated according to the correlation coefficient between the unit elements and the relative positions of the unit elements. The method for calculating the total spatial correlation between the unit elements in each of the elements and the total spatial correlation between the unit elements in different elements has been described above, and therefore it will not be described herein. In sub-step S712, the spatial correlation between the elements is calculated according to the total spatial correlation between the unit elements in each of the elements, the total spatial correlation between the unit elements in different elements, and the number of unit elements in each of the elements. The method for calculating the spatial correlation between the elements has been described above, and therefore it will not be described herein.

In step S72, a circuit layout having the greatest spatial correlation between elements is selected from a plurality of circuit layouts. In step S73, a random sampling is performed to each unit element in the selected circuit layout to generate a plurality of testing circuit samples. In step S74, the testing circuit samples are tested to generate a yield. In addition, in step S75, the testing circuit samples are further analyzed to obtain a variation of a ratio between the elements. It should be mentioned that the foregoing steps of the yield evaluating method in the present embodiment can be modified according to the actual requirement. For example, step S75 can be skipped, or, steps S72~S75 can be skipped so that the yield is evaluated only according to the spatial correlation between the elements.

Next, several examples will be described below to prove that the yield evaluating apparatus and the method thereof provided by the exemplary embodiments of the present invention can improve the yield of a circuit layout. It can be understood from following description that the yield evaluating apparatus and the method thereof in the exemplary embodiments of the present invention can be applied to the circuit layouts of different elements, such as capacitors and transistors, etc.

Figure 8:
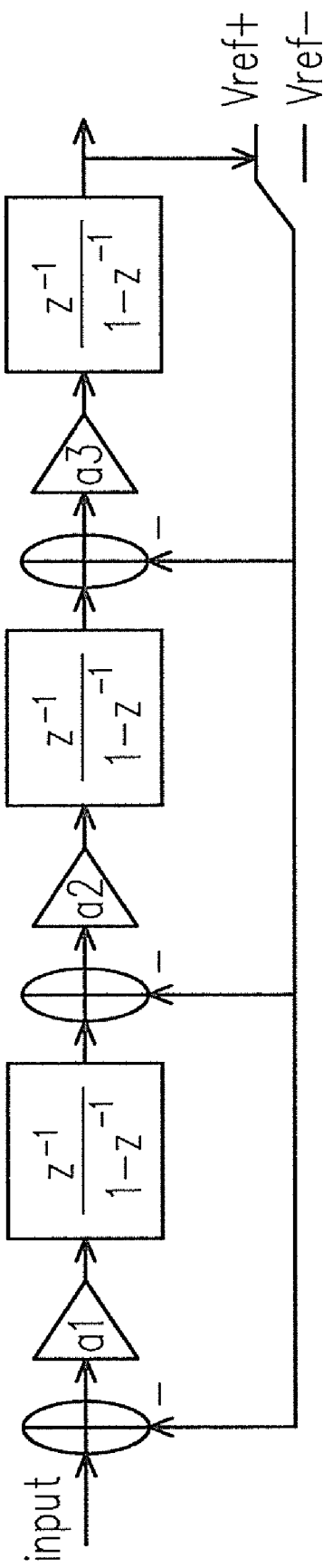
FIG. 8 is a system block diagram of an equivalent model of a Sigma-Delta modulator 30.

FIG. 8 is a system block diagram of an equivalent model of a Sigma-Delta modulator 30. It is assumed that the parameter a1 has a value 0.2, the parameter a2 has a value 0.3, and the parameter a3 has a value 0.4, wherein the value of the parameter a1 is the ratio between the capacitors $C_{sa1}$ and $C_{in1}$, the value of the parameter a2 is the ratio between the capacitors $C_{sa2}$ and $C_{in2}$, and the value of the parameter a3 is the ratio between the capacitors $C_{sa3}$ and $C_{in3}$. If the unit capacitor is 0.5 pF, then the capacitance of the capacitors $C_{in1}$~$C_{in3}$ is 10 pF, and the capacitors $C_{in1}$~$C_{in3}$ are respectively composed of 20 unit capacitors. Besides, the capacitances of the capacitors $C_{sa1}$, $C_{sa2}$, and $C_{sa3}$ are respectively 2 pF, 3 pF, and 4 pF, and the capacitors $C_{sa1}$, $C_{sa2}$, and $C_{sa3}$ are respectively composed of 4, 6, and 10 unit capacitors.

Figure 9A:
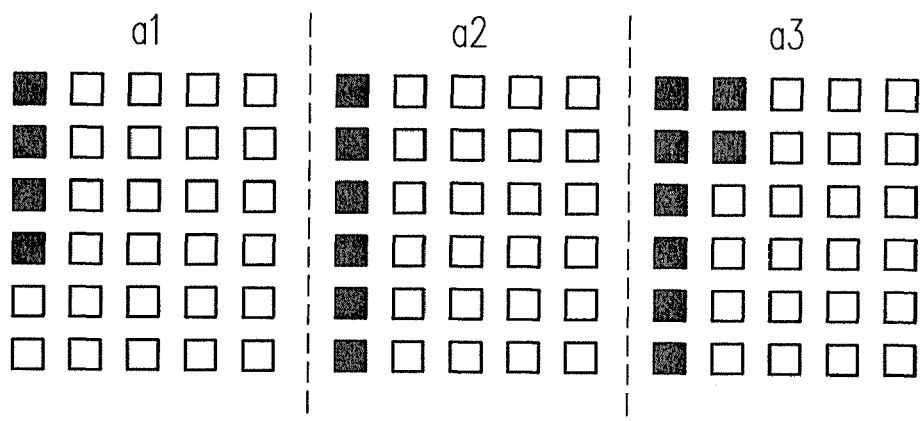
FIGS. 9A~9C are respectively diagrams of the different circuit layouts of parameters a1~a3.
Figure 9B:
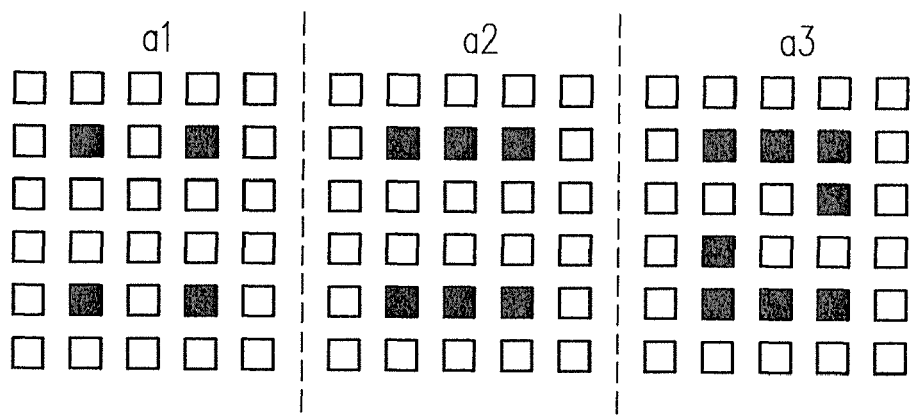
Figure 9C:
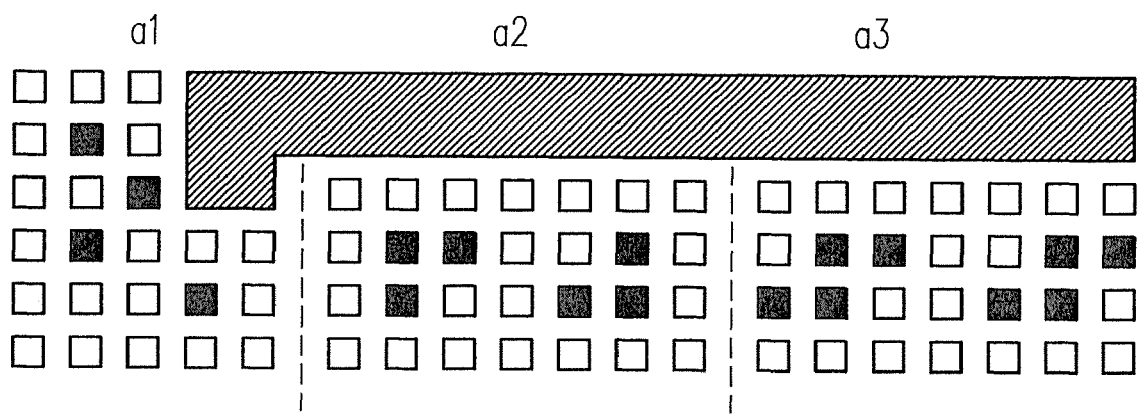

FIGS. 9A~9C are respectively diagrams of the different circuit layouts of the capacitors $C_{sa1}$, $C_{sa2}$, and $C_{sa3}$. Generally speaking, for the convenience of circuit routing, most chip designers will choose the circuit layout illustrated in FIG. 9A. FIGS. 9A and 9B respectively illustrate three 6×5 capacitor arrays which respectively form the parameters a1~a3. For example, in the leftmost capacitor array, the four unit capacitors marked with black background form the capacitor $C_{sa1}$, and the other unit capacitors (marked with white background) form the capacitor $C_{in1}$ and dummy capacitors. In the middle capacitor array, the six unit capacitors marked with black background form the capacitor $C_{sa2}$, and the other unit capacitors (marked with white background) form the capacitor $C_{in2}$ and dummy capacitors. In the rightmost capacitor array, the eight unit capacitors marked with black background form the capacitor $C_{sa3}$, and the other unit capacitors (marked with white background) form the capacitor $C_{in3}$ and dummy capacitors.

Herein it is assuming the variation of the unit capacitors is 10%, the standard deviation 6 thereof is 0.05 pF. The correlation coefficient between the unit capacitors can be extracted to be 0.9 from the process-related data provided by the foundry. If 14-bit data is adopted, the circuit is considered eligible only when the signal-to-noise ratio (SNR) thereof reaches 84 dB.

Generally speaking, the circuit yield is defined to be a ratio of the number of eligible circuits to the total number of circuit samples. If 200 testing circuit samples of the circuit layout illustrated in FIG. 9A are simulated, the SNRs of 153 testing circuit samples reach 84 dB; namely, the yield is 76.5%. In addition, the spatial correlation $\rho_{cst}(a1)$ between the capacitors $C_{sa1}$ and $C_{in1}$ is 0.892, the spatial correlation $\rho_{cst}(a2)$ between the capacitors $C_{sa1}$ and $C_{in2}$ is 0.899, and the spatial correlation $\rho_{cst}(a3)$ between the capacitors $C_{sa2}$ and $C_{in3}$ is 0.894.

If 200 testing circuit samples of the circuit layout illustrated in FIG. 9B are simulated, the SNRs of 187 testing circuit samples reach 84 db; namely, the yield is 93.5%. Besides, the spatial correlation $\rho_{cst}(a1)$ between the capacitors $C_{sa1}$ and $C_{in1}$ is 0.98, the spatial correlation $\rho_{cst}(a2)$ between the capacitors $C_{sa1}$ and $C_{in}$ is 0.981, and the spatial correlation $\rho_{cst}(a3)$ between the capacitors $C_{sa2}$ and $C_{in3}$ is 0.983. It can be understood by comparing the results in FIG. 9A and FIG. 9B that different circuit layouts can reduce the mismatching characteristic of capacitors and improve the circuit yield. On the other hand, which circuit layout is the optimal circuit layout can be determined by calculating the spatial correlation between the elements.

In an actual circuit design, the surface of a circuit layout may not be simply rectangular. As shown in FIG. 9C, the circuit layout has an irregular shape. The conventional common centroid method is applicable only to rectangular circuit layouts. However, the yield evaluating apparatus and the method thereof provided by the exemplary embodiments of the present invention can be adopted to evaluate the yield of an irregular-shaped circuit layout.

In the leftmost capacitor array in FIG. 9C, four unit capacitors marked with black background form the capacitor $C_{sa1}$, and the other unit capacitors (marked with white background) form the capacitor $C_{in1}$ and dummy capacitors. In the middle capacitor array, six unit capacitors marked with black background form the capacitor $C_{sa2}$, and the other unit capacitors (marked with white background) form the capacitor $C_{in2}$ and dummy capacitors. In the rightmost capacitor array, eight unit capacitors marked with the black background form the capacitor $C_{sa3}$, and the other unit capacitors (marked with white background) form the capacitor $C_{in3}$ and the dummy capacitors.

If 200 testing circuit samples of the circuit layout illustrated in FIG. 9C are simulated, the SNRs of 180 testing circuit samples reach 84 db; namely, the yield is 90%.

It can be concluded from the examples illustrated in FIGS. 9A~9C that the yield evaluating apparatus and the method thereof provided by the exemplary embodiments of the present invention can not only quantify the rules in the common centroid method but also evaluate the corresponding circuit yield. Besides, the yield evaluating apparatus and the method thereof provided by the present invention are applicable to irregular circuit layouts which cannot be processed through the common centroid method. In addition, the yield evaluating apparatus and the method thereof provided by the exemplary embodiment of the present invention can instantly provide information about variations and yield loss on the physical level to a chip designer through calculations performed on the system level, so that both the time and cost spent on chip design can be greatly reduced.

Figure 10:
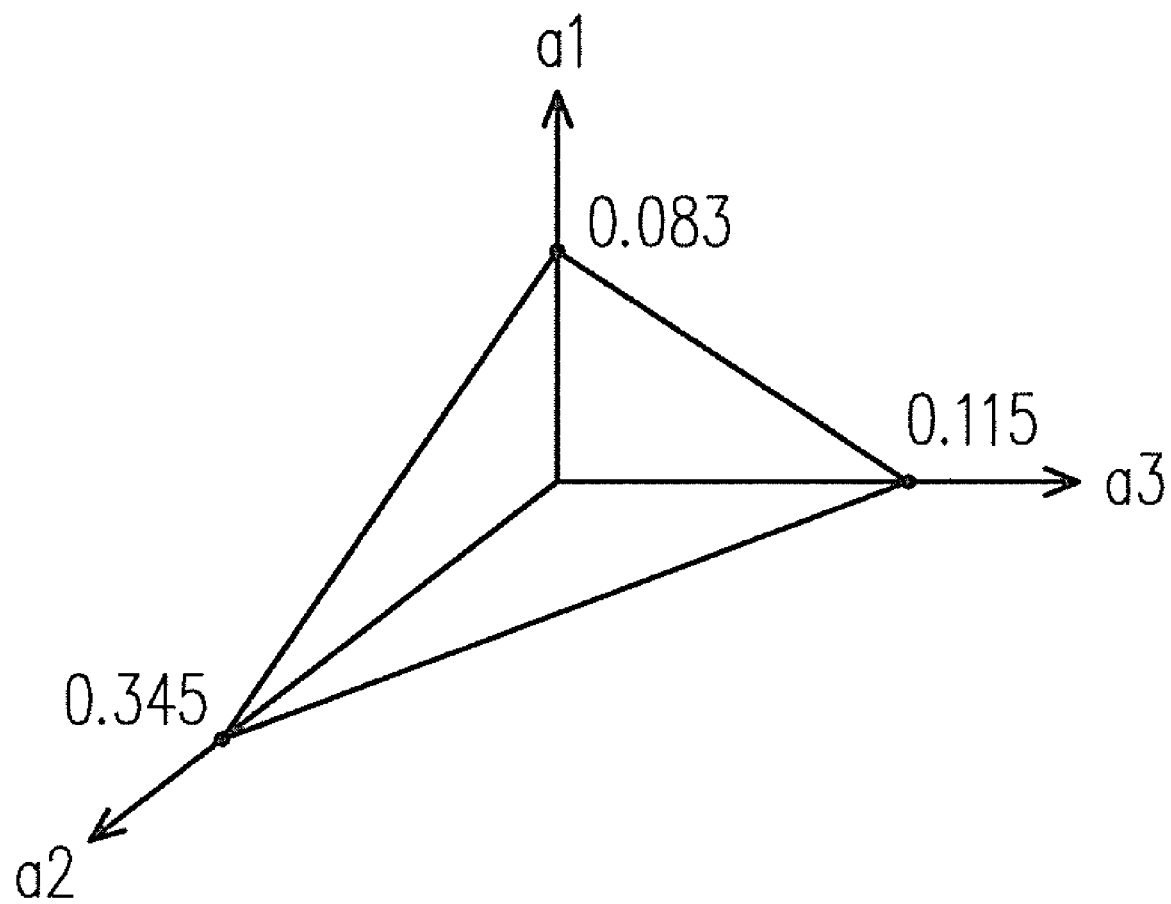
FIG. 10 illustrates a distribution curve of a tolerable variation range of the parameters a1~a3.

FIG. 10 illustrates a distribution curve of the tolerable variation range of parameters a1~a3. As shown in FIG. 10, in the Sigma-Delta modulator 30, the tolerances of the parameter a1~a3 in the circuit are respectively a1, a2, and a3, wherein a3>a2>a1. Thus, the parameter a1 is a critical coefficient, and when the circuit layout of the Sigma-Delta modulator 30 is implemented, the analysis to the circuit layout can be performed only regarding the parameter a1 in order to further reduce the simulation time.

The yield evaluating apparatus and the method of the present invention are suitable for different types of circuits. A switched-capacitance filter will be taken as an example, wherein the capacitances of capacitors C1~C4 in the switched-capacitance filter are respectively 0.2 pF, 0.22 pF, 3.12 pF, and 8.96 pF. If the unit capacitor in the circuit layout is 0.2 pF, the variation is 1% (i.e., 0.002 pF), and the correlation coefficient between the unit capacitors is 0.8, the ratio between the numbers of unit capacitors in the capacitors C1~C4 is 1:1.1:15.6:44.8.

FIGS. 11A and 11B are respectively diagrams of two different circuit layouts of the capacitors C1~C4 in a switched-capacitance filter. FIG. 11A illustrates a circuit layout which is formed based on the rules in the common centroid method, and FIG. 11B illustrates a circuit layout which is formed through a general series connection method. The unit capacitors marked with the digit 1 form the capacitor C1, the unit capacitors marked with the digit 2 form the capacitor C2, the unit capacitors marked with the digit 3 form the capacitor C3, and the unit capacitors marked with the digit 4 form the capacitor C4.

Then, 200 testing circuit samples are respectively produced according to the circuit layouts illustrated in FIG. 11A and FIG. 11B and are simulated. It can be observed from the simulations that the variations of DC gain, cut-off frequency, and quality factor sampling point of the testing circuit samples produced according to the circuit layout in FIG. 11A are all smaller than those of the testing circuit samples produced according to the circuit layout in FIG. 11B.

FIG. 11C is a table for comparing the spatial correlations between every two of the capacitors C1~C4 in the circuit layouts illustrated in FIGS. 11A and 11B. It can be observed by calculating the spatial correlations between every two of the capacitors C1~C4 that the spatial correlations between every two of the capacitors C1~C4 in the circuit layout in FIG. 11A are greater than those in FIG. 11B.

In the switched-capacitance filter, the variations between every two of the capacitors C1~C4 cannot be too large. If these variations have similar tolerance, the spatial correlation between every two of the capacitors C1~C4 has to be considered to select the circuit layout. For example, the spatial correlations between every two of capacitors C1~C4 are averaged or a weighted calculation is performed to the spatial correlations between every two of the capacitors C1~C4, and the circuit layout having the greatest average value or weighted calculation result is selected. In addition, if only the yield is required to reach certain standard, a threshold can be set and a circuit layout having all the spatial correlations between every two of the capacitors C1~C4 greater than the threshold is selected.

As described above, the greater the spatial correlation between the elements is, the smaller variation and accordingly the higher yield the circuit layout has. Thus, regarding a simple circuit, a plurality of testing circuit samples are produced based on the variations between the elements and are directly simulated to select a circuit layout according to the variations. However, the direct simulation may be too time-consuming regarding a larger circuit. Thus, the circuit layout can be directly selected by calculating the spatial correlation between the elements to reduce the time spent on circuit simulation.

In short, if the circuit is simple, the yield evaluating apparatus and the method thereof provided by the exemplary embodiments of the present invention can directly figure out the quality of a circuit layout through the circuit simulation and accordingly the physical measure of chips can be avoided.

Figure 12:
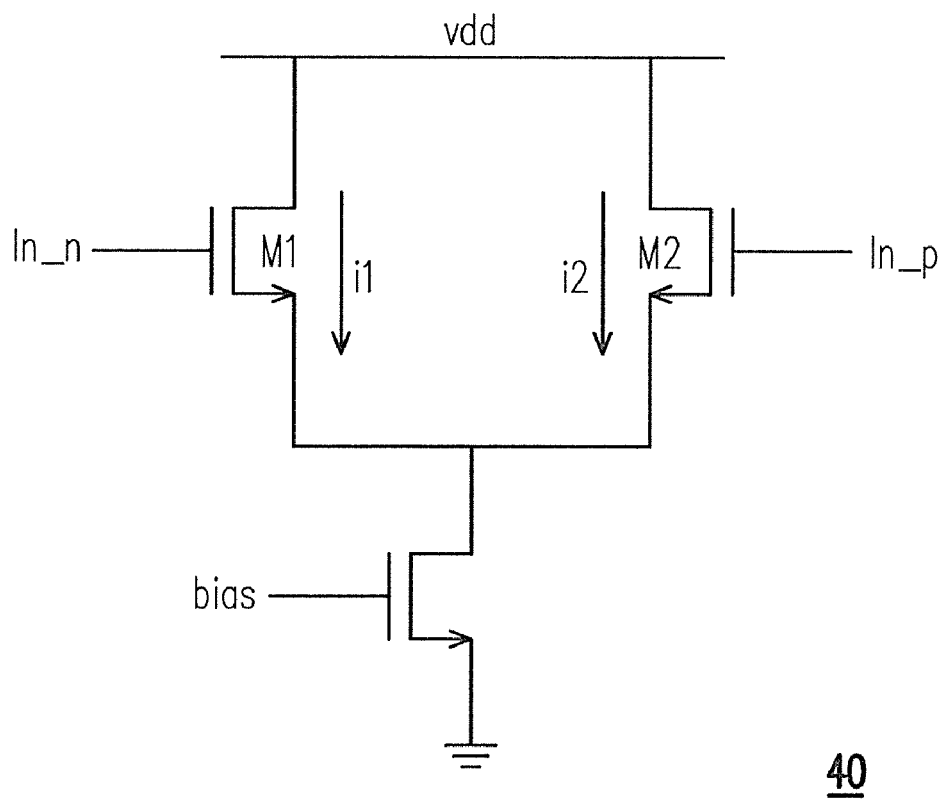
FIG. 12 is a circuit diagram of a simple differential input circuit 40.

Application of the yield evaluating apparatus and the method thereof provided by the exemplary embodiments of the present invention to transistors will be described below with reference to an exemplary embodiment of the present invention. FIG. 12 is a circuit diagram of a simple differential input circuit 40. Referring to FIG. 12, whether the currents i1 and i2 are equal to each other is related to the matching level of the transistors M1 and M2.

Figures 13A, 13B:
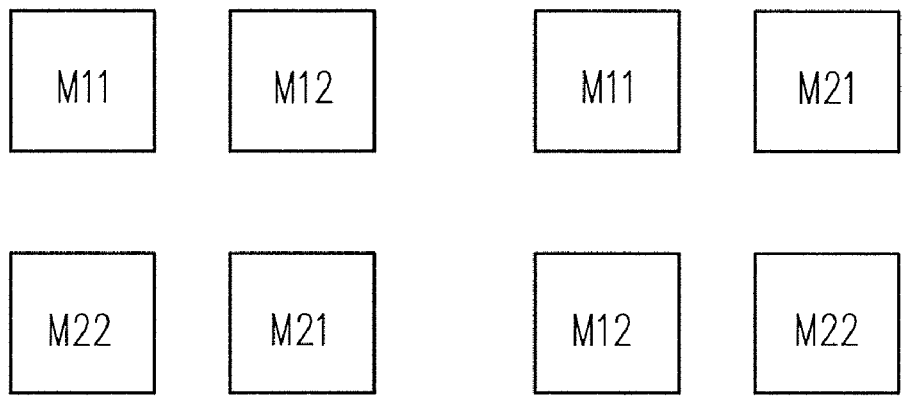
FIGS. 13A and 13B are respectively diagrams of two different circuit layouts of transistors M1~M4 in the differential input circuit 40.

FIGS. 13A and 13B are diagrams of two different circuit layouts of the transistors M1 and M2 in the differential input circuit 40. Referring to FIG. 13A and FIG. 13B, the transistor M1 is composed of two unit transistors M11 and M12, and the transistor M2 is composed of two unit transistors M21 and M22. It is assumed that the variation of the threshold voltage Vth of the transistors M1 and M2 is 0.002V, and the correlation coefficient between the unit transistors is 0.9. It can be understood through the circuit simulation that the variation of the difference between the currents i1 and i2 in the circuit layout illustrated in FIG. 13A is 236 nA, and the variation of the difference between the currents i1 and i2 in the circuit layout illustrated in FIG. 13B is 329.4 nA.

In addition, the spatial correlation between the transistors M1 and M2 in the circuit layout illustrated in FIG. 13A is 0.97, and the spatial correlation between the transistors M1 and M2 in the circuit layout illustrated in FIG. 13B is 0.93. Obviously, the spatial correlation between the transistors M1 and M2 in the circuit layout illustrated in FIG. 13A is greater than that in FIG. 13B, and the variation of the difference between the currents i1 and i2 in the circuit layout illustrated in FIG. 13A is smaller than that in FIG. 13B.

The yield evaluating apparatus and the method thereof provided by the exemplary embodiments of the present invention are applicable to circuit layouts composed of transistors or capacitors. However, the present invention is not limited thereto, and the yield evaluating apparatus and the method thereof provided by the exemplary embodiments of the present invention may also be applied to circuit layouts composed of other types of elements (for example, resistors or inductors). Besides, a smaller performance variation and a higher yield can be obtained in every exemplary embodiment described above. Thus, direct simulation can be carried out to a simple circuit in order to select a circuit layout having a smaller performance variation.

As described above, the yield evaluating apparatus and the method thereof provided by the exemplary embodiments of the present invention can not only quantify the rules in the common centroid method but also evaluate the corresponding circuit yield. Moreover, the yield evaluating apparatus and the method thereof provided by the exemplary embodiments of the present invention are applicable to irregular circuit layouts which cannot be processed through the common centroid method. Furthermore, the yield evaluating apparatus and the method thereof provided by the exemplary embodiments of the present invention can instantly provide information about variation and yield loss on the physical level to a chip designer through calculations carried out on the system level, so that both the time and cost spent on circuit design can be greatly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A yield evaluating apparatus, comprising:
    a spatial correlation module, for receiving at least one process-related data and a plurality of circuit layouts, wherein the spatial correlation module obtains a spatial correlation coefficient between unit elements in the circuit layouts according to the at least one process-related data and calculates a spatial correlation between elements in each of the circuit layouts according to the spatial correlation coefficient, and the spatial correlation module selects one of the circuit layouts according to the spatial correlations; and
    a random sampling point generator, coupled to the spatial correlation module, wherein the random sampling point generator performs a random sampling to the circuit layout selected by the spatial correlation module to generate a plurality of testing circuit layout samples, and the random sampling point generator tests the testing circuit layout samples to evaluate a yield of the circuit layout selected by the spatial correlation module; and
    a computer, for implementing the spatial correlation module and the random sampling point generator.

2. The yield evaluating apparatus according to claim 1, wherein the spatial correlation module selects the circuit layout having the greatest spatial correlation from the circuit layouts.

3. The yield evaluating apparatus according to claim 1, wherein the at least one process-related data comprises the spatial correlation coefficient.

4. The yield evaluating apparatus according to claim 1, wherein the at least one process-related data comprises a variation of the unit elements in the circuit layouts, and the spatial correlation module extracts the spatial correlation coefficient according to a trend diagram of the variation.

5. The yield evaluating apparatus according to claim 1, wherein the random sampling point generator further analyzes the testing circuit layout samples to obtain a variation of a ratio between the elements in the circuit layout.

6. The yield evaluating apparatus according to claim 1, wherein regarding each of the circuit layouts, the spatial correlation module calculates a total spatial correlation between the unit elements in each of the elements in the circuit layout and a total spatial correlation between the unit elements in different elements in the circuit layout according to the spatial correlation coefficient, and the spatial correlation module calculates the spatial correlation between the elements in the circuit layout according to the total spatial correlation between the unit elements in each of the elements, the total spatial correlation between the unit elements in different elements, and a number of the unit elements in each of the elements.

7. The yield evaluating apparatus according to claim 1, wherein the elements are capacitors, and the unit elements are unit capacitors.

8. The yield evaluating apparatus according to claim 1, wherein the elements are transistors, and the unit elements are unit transistors.

9. A yield evaluating method, for selecting one of a plurality of circuit layouts, the yield evaluating method comprising:
    obtaining a spatial correlation coefficient between unit elements in the circuit layouts by a computer;
    calculating a spatial correlation between elements in each of the circuit layouts according to the spatial correlation coefficient by the computer;
    selecting the circuit layout having the greatest spatial correlation from the circuit layouts by the computer;
    performing a random sampling to each of the unit elements in the selected circuit layout to generate a plurality of testing circuit layout samples by the computer; and
    testing the testing circuit layout samples to evaluate a yield of the selected circuit layout by the computer.

10. The yield evaluating method according to claim 9 further comprising:
    analyzing the testing circuit layout samples to obtain a variation of a ratio between the elements in the selected circuit layout.

11. The yield evaluating method according to claim 9, wherein the step of obtaining the spatial correlation coefficient comprises:
    receiving at least one process-related data; and
    obtaining the spatial correlation coefficient from the at least one process-related data.

12. The yield evaluating method according to claim 11, wherein the at least one process-related data comprises the spatial correlation coefficient.

13. The yield evaluating method according to claim 11, wherein the at least one process-related data comprises a variation of the unit elements in the circuit layouts.

14. The yield evaluating method according to claim 11, wherein the step of calculating the spatial correlation between the elements in each of the circuit layouts comprises:
    calculating a total spatial correlation between the unit elements in each of the elements in the circuit layout and a total spatial correlation between the unit elements in different elements in the circuit layout according to the spatial correlation coefficient; and
    calculating the spatial correlation between the elements in the circuit layout according to the total spatial correlation between the unit elements in each of the elements, the total spatial correlation between the unit elements in different elements, and a number of the unit elements in each of the elements.

* * * * *